United States Patent Office 3,687,848
Patented Aug. 29, 1972

3,687,848
LUBRICATING OIL COMPOSITIONS
Terence Colclough, Charlton Wantage, Arthur L. Morris, Didcot, and Robert J. Hodges, Weston-Super-Mare, England, assignors to Esso Research and Engineering Company
No Drawing. Filed July 13, 1970, Ser. No. 54,623
Claims priority, application Great Britain, July 18, 1969, 36,253/69
Int. Cl. C10m 1/48
U.S. Cl. 252—32.7 E
2 Claims

ABSTRACT OF THE DISCLOSURE

A lubricating oil composition having as an antioxidant and antiwear additive a mixture of (1) of phosphorothionyl or phosphonyl sulphide of the formulae

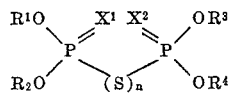

or

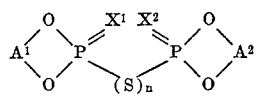

where $R^1$, $R^2$, $R^3$ and $R^4$ are hydrocarbyl groups $A^1$ and $A^2$ are divalent hydrocarbon groups, $X^1$ and $X^2$ are oxygen or sulphur, and $n$ is an integer of 1 to 4 and (2) an organic ammonium thiophosphate of the formulae

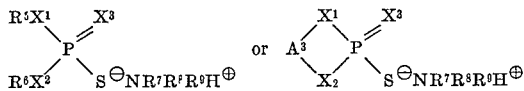

where $R^5$, $R^6$ and $R^7$ are hydrocarbyl groups, $A^3$ is a divalent hydrocarbon group, $X^1$, $X^2$ and $X^3$ are oxygen or sulphur, $R^8$ and $R^9$ are hydrogen or hydrocarbyl groups.

This invention relates to lubricating oil additives which confer antioxidant and antiwear properties on the lubricating oil.

According to this invention a lubricating oil composition comprises a major proportion by weight of a lubricating oil and a minor proportion by weight of a mixture of (1) a phosphorothionyl or phosphonyl sulphide of the formulae

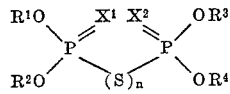

or

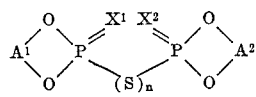

where $R^1$, $R^2$, $R^3$ and $R^4$ are hydrogen- and carbon-containing groups, $A^1$ and $A^2$ are the same or different and aryl divalent hydrogen and carbon-containing groups, $X^1$ and $X^2$ similar or dissimilar are oxygen or sulphur, and $n$ is an integer of 1 to 4 inclusive, preferably 2, and (2) an organic ammonium thiophosphate of the formulae

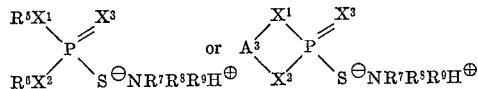

where $R^5$, $R^6$ and $R^7$ are hydrogen and carbon-containing groups, $A^3$ is a divalent hydrogen- and carbon-containing group, $X^1$, $X^2$ and $X^3$ similar or dissimilar are oxygen or sulphur, $R^8$ and $R^9$ are hydrogen or hydrogen- and carbon-containing groups, the mole ratio of (1) and (2) preferably being between 5:1 and 1:5, e.g. between 2:1 and 1:2.

Surprisingly enough it has been found that the particular combination of phosphorus-containing compounds in the particular molar ratio specified gives a synergistic effect and confers on the lubricating oil good oxidation stability and anti-wear properties.

For component (1) of the additive combination, i.e. the phosphorothionyl ($X_1$ and $X_2$=S) or phosphonyl ($X_1$ and $X_2$=O) sulphide, the hydrogen- and carbon-containing groups $R^1$, $R^2$, $R^3$ and $R^4$ may be aliphatic or aromatic, e.g. they may be hydrocarbyl such as alkyl, aryl, alkaryl or aralkyl. If alkyl, the groups $R^1$, $R^2$, $R^3$ and $R^4$ preferably contain between 5 and 25 carbon atoms. Suitable aryl groups include phenyl, naphthyl, anthranyl, whilst suitable alkaryl groups are $C_1$ to $C_{18}$ alkyl phenyl, e.g. tolyl xylyl, nonyl phenyl, dodecyl phenyl, octadecyl phenyl, dibutyl phenyl, butyl pentyl phenyl, and dinonyl phenyl. Aralkyl groups include benzyl, 2-phenyl butyl, and 2-phenyl ethyl.

As an alternative to being hydrocarbyl, the groups $R^1$, $R^2$, $R^3$ and $R^4$ may contain oxygen atoms, e.g. they may be alkoxyalkyl, for instance methoxybutyl, or alkoxyaryl, for instance ethoxyphenyl, or aryloxyalkyl, e.g. phenoxyethyl.

There is no need for the groups $R^1$, $R^2$, $R^3$ and $R^4$ to be of the same type, let alone to be the same. Thus, they may be all different, or they may be divided into two similar pairs.

The divalent hydrogen- and carbon-containing groups $A^1$, $A^2$ and $A^3$ in components (1) and (2) of the additive combination may be aromatic or aliphatic. Thus, they may be for example phenylene, bisphenylene or their alkylated derivatives in which case the dithiophosphate is derived from catechol, resorcinol, bisphenol or their alkylated derivatives. Alternatively the groups $A^1$, $A^2$ and $A^3$ can be the group

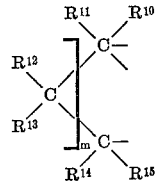

where $R^{10}$, $R^{11}$, $R^{12}$, $R^{13}$, $R^{14}$ and $R^{15}$ are hydrogen or hydrogen- and carbon-containing groups, and $m$ is zero or an integer, and preferably zero or an integer from one to six inclusive. Both types of compounds are readily prepared from diols or dithiols wherein the carbon atoms bearing —OH and/or —SH groups are contiguous or separated by $m$ carbon atoms. Preferably the groups $R^{10}$ to $R^{15}$ inclusive contain only carbon and hydrogen atoms i.e. they are hydrocarbyl groups, e.g. alkyl, alkaryl, aryl, aralkyl, alicyclic or alkenyl groups. These groups $R^{10}$ to $R^{15}$ preferably contain 1 to 6 carbon atoms, e.g. methyl, or ethyl. Particularly suitable diols from which these types of components (1) and (2) are derived are 2-methyl pentane, 2,4-diol; butane-2,3 diol; 2-ethyl hexane-1,3 diol; and pinacol (2,3 di methyl 2,3 butane diol); hexane 1,6 diol, decane 1,10 diol, butane 1,3 diol, 2,2-dimethyl propane, 1,3-diol; 2,2-diethyl propane 1,3 diol.

In component (1) the number of sulphur atoms linking the two phosphorus atoms, i.e. the value of $n$, must be between 1 and 4. However, $n$ is preferably 2, i.e. component (1) is preferably a phosphorothionyl or phosphonyl disulphide.

Component (1) where $X^1$ and $X^2$ are sulphur can be readily prepared by heating together a hydroxy compound, (e.g. a phenol, alcohol or diol) and $P_2S_5$ to form an organo-substituted thiophosphoric acid and then further reacting this acid product with an oxidising agent, e.g. hydrogen peroxide, nitrous acid, iodine or sodium hypohalites.

Component (1) when $X^1$ and $X^2$ are oxygen can be prepared by the treatment of the corresponding phosphite $(RO)_2P(O)H$ with sulphur chloride.

In component (2) the atoms $X^1$, $X^2$ and $X^3$ may be all the same, but $X^1$ and $X^2$ are preferably both oxygen atoms and $X^3$ is preferably sulphur. The preferred types and examples of $R^5$ and $R^6$ are exactly the same as those for $R^1$ and $R^2$ described above in connection with component (1).

The amine $(NR^7R^8R^9)$ from which component (2) is derived can be a primary, secondary or tertiary amine or a polyamine having more than one amino group. It may also be an alkyl, aryl, alkaryl, or aralkyl amine. Thus, the amine can be a primary alkyl amine, especially a $C_4$ to $C_{24}$ alkyl amine such as a butylamine, nonylamine, or laurylamine, a tetradecyclamine, an octadecylamine, an eicosylamine, or branched chain primary amine analogues, such as Primene 81-R (a t-alkyl primary amine $C_{12}$-$C_{24}$). It may alternatively be secondary amine having two alkyl groups attached to the nitrogen atoms in which the alkyl groups may have for example chain lengths of 1 to 12 carbon atoms, for example dihexyl amine or a dioctyl amine. As another alternative, the amine could be a tertiary alkyl amine in which the alkyl groups may have 1 to 12 carbon atoms e.g. triethyl amine or a tridecyl amine. In both secondary and tertiary amines the alkyl groups attached to the N atoms may have the same or different chain lengths, e.g. methylnonyl amine, or methyl butyl nonyl amine.

Suitable polyamines include diamines, e.g. a hexylene diamine, an octylene diamine, a decylene diamine, or the mono- or di-N alkyl substituted derivatives of short chain diamines, such as $C_2$ to $C_6$ alkylene diamines. N-hydrocarbyl or N,N' di-hydrocarbyl substituted ethylene or propylene diamines, where the hydrocarbyl groups have at least 3 carbon atoms, e.g. 3-lauryl-amine-1-butyl amine or N,N' di-dodecyl-1,3-propylene diamine are suitable examples.

Component (2) where $X^3$ is sulphur, of the additive mixture can be readily prepared by heating together a hydroxy or thiol compound (e.g. a phenol, alcohol, diol, or dithiol), $P_2S_5$, and amine.

Component (2) where $X^3$ is oxygen can be obtained by heating the corresponding phosphite with sulphur in the presence of the amine in approximately equimolar proportions.

For improved compatibility between the two components (1) and (2) of the additive when they are being mixed in concentrated form it has been found that component (2) is best prepared in two stages, that is phosphosulphurisation of the hydroxy or thiol compound using $P_2S_5$, followed by neutralisation with the amine.

The mole ratio of components (1) and (2) of the additive mixture should lie between 5:1 and 1:5, e.g. between 2:1 and 1:2 respectively.

Suitable lubricating oils for compositions of this invention include animal, vegetable or mineral oils, for example petroleum oil fractions ranging from spindle oil to SAE 30, 40 or 50 lubricating oil grades, castor oil, fish oils, oxidised mineral oil or brightstocks. Synthetic esters may also be used, e.g. diesters such as those prepared by esterifying carboxylic acids such as adipic or sebacic acid with monohydric alcohols: or complex esters obtained by the esterification of a polyhydric alcohol (e.g. a polyglycol) with a dibasic acid (e.g. sebacic or adipic acid) and a monohydric alcohol (e.g. 2-ethyl hexanol or a $C_8$ oxo alcohol).

The minor amount of additive, i.e. components (1) and (2) which is added to the lubricating oil can vary but is preferably between 0.01 and 10% by weight, e.g. between 0.1 and 5% by weight based on the total weight of the composition.

Other additives, for example detergents (e.g. calcium sulphonates) or VI improvers (e.g. vinyl acetate/fumarate copolymers) may be added to the oil composition.

(A) Preparation of component (2) (alkylammonium dithiophosphate)

The product was most conveniently prepared as the 75% concentrate using a single-stage reaction procedure. AB/KB 25 was used as solvent and diluent oil. The following ingredients were used:

Hexylene glycol _____ 23.6 g. (0.20 mole).
Phosphorus pentasulphide _____ 22.2 g. (0.10 mole).
AB/KB 25 [1] _____ 22.6 g.
Primene 81–R (primary amine $C_{12-14}$) _____ 35.4 g. (0.18 mole).

[1] AB/KB 25 is a solvent extracted dewaxed paraffinic basestock having a kinematic viscosity at 100° F. at 21.7 cs.

Phosphorus pentasulphide and AB/KB 25 were charged into the reactor and stirred at ambient temperature under nitrogen. Hexylene glycol and Primene 81–R were mixed and added portionwise to the reaction mixture at such a rate as to keep the reaction temperature below 140° C. and not cause excessive foaming. After the addition was completed the temperature was maintained at 140° C. for 30 minutes. The resultant product required no filtration or stripping.

(B) Alternative preparation of component (2)

The product was prepared as a 75% concentrate using a two-stage reaction procedure. Chlorobenzene was used as solvent. The following ingredients were required:

Hexylene glycol _____ 23.6 g. (0.20 mole).
Phosphorus pentasulphide _____ 22.2 g. (0.10 mole).
Chlorobenzene _____ 75 ml.
Primene 81–R _____ 35.4 g. (0.18 mole).
AB/KB 25 _____ 22.6 g.

Phosphorus pentasulphide, chlorobenzene and hexylene glycol were charged into the reactor and stirred under nitrogen for 1 hour at 100° C. The solution was allowed to cool and Primene 81–R and AB/KB 25 were added slowly. After stirring for 15 minutes, the reaction mixture was stripped to leave the 75% concentrate in AB/KB 25.

EXAMPLE

Lubricating oil compositions were prepared by adding in one case 0.6 wt. percent of compound A and 0.4 wt. percent of compound B to a mineral lubricating oil; and in the other case 0.7 wt. percent and 0.3 wt. percent of compounds A and B respectively to a mineral lubricating oil.

Compound A is the phosphorothionyl disulphide derived from a $C_8$–$C_9$ alkylphenol. Compound B is the dithiophosphate derived from hexylene glycol, $P_2S_5$ and Primene 81–R (a $C_{12}$–$C_{14}$ tertiary alkyl primary amine).

The antiwear and antioxidant activity of Compounds A and B and their mixtures were evaluated in a Volvo Cam and Tappet test (Volvo test code M53, December 1964) and a Petter W1 engine test (IP 176/64) respectively. These engine tests were carried out in a typical 10W-40 multigrade oil containing an acrylate VI improver, 300 TBN calcium overbased sulphonate and thiophosphonate detergents and ashless dispersant, but no other added antioxidant or antiwear agent.

| Compound | Wt. percent | Mole ratio, A:B | Volvo | Petter W1 BWL (mg.) |
|---|---|---|---|---|
| A | 1.5 | | Fail (4 cams worn) [1] | |
| B | 0.4 | | Fail (6 cams worn) | >90 |
| A/B | 0.6/0.4 | 1:1.3 | Pass | 19 |
| A/B | 0.7/0.3 | 1.2:1 | do | 13 |
| A | 0.7 | | | 9 |

[1] Cam rated as fail if wear 0.25 mm.

These results show that Compound A is a good antioxidant but has little antiwear activity alone, whereas Compound B is a good antiwear agent but has poor antioxidant activity. A combination of the two additives, however, possesses good antiwear and antioxidant activity and synergism is observed in the Volvo engine test.

What we claim is:

1. A lubricating oil composition comprising a major amount of mineral lubricating oil and a synergistic antiwear amount in the range of 0.1 to 5 wt. percent, based on the total weight of said composition, of a mixture of phosphorothionyl disulfide of $C_1$ to $C_{18}$ alkyl phenol of the formula:

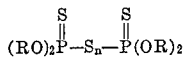

wherein each R is an alkyl phenyl group, and $n$ is 2; and alkyl ammonium dithiophosphate prepared by reacting hexylene glycol, $P_2S_5$ and $C_{12}$ to $C_{14}$ tertiary alkyl amine, in a relative molar ratio of 1 to 1.2 molar proportions of said disulfide per 1 to 1.3 molar proportions of said dithiophosphate.

2. A composition according to claim 1 wherein said composition contains about 0.6 to 0.7 wt. percent of said disulfide, wherein said alkyl phenol is a $C_8$ to $C_9$ alkyl phenol, and the amount of said dithiophosphate is about 0.3 to 0.4 wt. percent.

References Cited

UNITED STATES PATENTS

| | | | |
|---|---|---|---|
| 2,443,264 | 6/1948 | Mikeska | 252—46.6 |
| 3,192,162 | 6/1965 | Bartlett et al. | 252—46.6 |
| 2,063,629 | 12/1936 | Salzberg et al. | 252—46.6 X |
| 3,002,014 | 9/1961 | Dinsmore et al. | 252—327 E X |
| 2,343,831 | 3/1944 | Osborne | 252—46.6 |
| 3,058,910 | 10/1962 | Culmer | 252—32.7 E |

DANIEL E. WYMAN, Primary Examiner

W. H. CANNON, Assistant Examiner

U.S. Cl. X.R.

252—46.6